United States Patent [19]

Myers

[11] 4,438,004
[45] Mar. 20, 1984

[54] FUSED METALLIC FRICTION MATERIALS

[75] Inventor: Paul A. Myers, Crawfordsville, Ind.

[73] Assignee: Raymark Industries, Inc., Trumbull, Conn.

[21] Appl. No.: 447,149

[22] Filed: Dec. 6, 1982

[51] Int. Cl.³ .................. C10M 7/04; C10M 7/26; C10M 7/52
[52] U.S. Cl. .................. 252/12; 523/153; 106/36; 188/251 M; 188/251 R; 260/998.13
[58] Field of Search .................. 252/12; 523/153; 106/36; 188/251 M; 260/998.13

[56] References Cited

U.S. PATENT DOCUMENTS

| | | | |
|---|---|---|---|
| 3,434,998 | 3/1969 | Aldrich et al. | 523/153 |
| 3,647,033 | 3/1972 | Klein | 188/251 R |
| 3,932,568 | 1/1976 | Watts et al. | 106/36 |
| 4,051,097 | 9/1977 | Aldrich | 106/36 |

*Primary Examiner*—Jacqueline V. Howard
*Attorney, Agent, or Firm*—Gary, Juettner & Pyle

[57] ABSTRACT

A friction material member particularly useful in high load and temperature applications and a method for making the same are disclosed. The friction material member is made by preparing a mixture of sinterable metal particles, carbonaceous material, friction enhancers and curable polymeric resin; the mixture comprising at least about 50 percent by weight of metal particles and sufficient resin to coat and bond the metal particles, carbonaceous material and friction enhancers. The mixture is molded and the resin cured to form a piece in a solid preformed shape corresponding to the shape of the mold. Thereafter, the preformed piece is heated in a substantially oxygen free atmosphere for a time and at temperatures and pressures sufficient to fuse at least a portion of the metal particles into a sintered metal matrix. The preformed piece may be sintered to a metal backing plate during the heating step, or may be welded, brazed or soldered to the plate after heating. The resulting product may be classified as a hybrid friction material, i.e., being a cross between semi-metallic and sintered full metallic friction materials.

29 Claims, No Drawings

FUSED METALLIC FRICTION MATERIALS

BACKGROUND OF THE INVENTION

This invention relates to friction materials for all applications, and more particularly to semi-metallic and sintered full metallic friction materials utilized in heavy duty brake assemblies.

Sintered full metallic friction material members are well known, as described in U.S. Pat. No. 3,647,033 to Klein and U.S. Pat. No. 3,698,526 to Berges. A prior art full metallic mixture contains 60 to 90 percent by weight metal powders, 5 to 30 percent by weight carbonaceous materials, and zero to 15 percent by weight mineral fillers and friction enhancers. The mixture is typically molded at room temperature under extremely high pressures, on the order of 30,000 to 70,000 PSI. The resulting piece is then sintered in accordance with well defined concepts of powdered metallurgy. The bonding of the friction material member is due solely to the metal matrix formed by sintering. The metal content must be high, 60 percent or more by weight, to provide sufficient metal to metal contact to fuse the powders into a matrix. It is also well known that the piece may be sintered directly to a metal backing plate, e.g., a brake shoe.

The advantage of sintered full metallic friction material members is that they can operate at high temperature, and, when sintered to a metal backing plate, do not detach under high temperature and load conditions. However, full metallics are very expensive to manufacture. A large press, capable of exerting pressures in excess of 70,000 PSI, is required to mold the material. Mold life is short due to the high pressure molding. During the sintering process, the material has a tendancy to "bulge" or "edge crack"; and thus, these pieces must be discarded. In use, full metallic members tend to be ineffective when cold, structurally brittle and cause high opposing surface wear, often grooving the opposing surface, due to the member's high metal content.

Semi-metallic friction material members are also well known, as described in U.S. Pat. No. 3,647,033 to Klein and U.S. Pat. No. 3,434,998 to Aldrich. A conventional semi-metallic mixture contains 50 to 80 percent by weight metal fibers and powders, 10 to 20 percent by weight carbonaceous material, 7 to 20 percent by weight inorganic friction enhancers, zero to 5 percent by weight organic friction enhancers, and 5-15 percent by weight organic resin. The mixture is molded and the resin cured by the application of temperature, pressure and/or catalyst depending upon the particular resin used. The resulting pad is attached to a backing plate with an organic adhesive.

The principal differences between semi-metallics and full metallics is that: (1) the structural bonding of semi-metallics is due solely to the resin, while bonding in full metallics is due solely to the sintered metal matrix; (2) semi-metallics have considerably less percent by weight of metal particles than full metallics and typically contain metal fibers in addition to metal powders; (3) semi-metallics generally have a higher percent by weight of inorganic friction enhancers; and (4) typically contain organic friction enhancers (e.g., tire buffings), while full metallics, for the most part, do not contain organic friction enhancers (for the reason that organic materials will carbonize during sintering, reducing the density of the final pad and interfering with fusing of the metal powders).

The advantage of semi-metallics is that they are considerably cheaper to manufacture than full metallics, due to the much lower molding pressures and increased mold life, elimination of the sintering process, lower material costs, and a significant reduction in waste (no bulging or edge cracking with semi-metallics). However, in heavy duty applications, where operating temperatures often exceed 600° F., the resin and the attaching adhesive tend to break down. The result is loss of friction, excessive wear of the friction material, detachment of the friction member from its backing plate, and in some instances flaming (the decomposing resin produces volitile gases which may ignite). A further disadvantage of semi-metallics is that the green (new) performance is not as good as full metallics, thus requiring a longer break-in period.

It would be desirable to have a friction material member that is relatively inexpensive to manufacture, performs well under high temperature and load conditions, does not detach or flame, has good green performance, and has greater resiliance.

SUMMARY OF THE INVENTION

In accordance with the present invention, a hybrid friction material member is provided, which has the benefits of both full metallics and semi-metallics. The friction member of the invention is suitable to all types of brakes, clutches, etc. and is particularly useful in heavy duty disc brake applications.

A mixture containing 50 percent or more by weight of sinterable metal particles is mixed with carbonaceous material, friction enhancers and 1 to 15 percent by weight of curable polymeric resin. The mixture is molded and the resin cured by application of heat, pressure and/or catalyst to form a preformed piece. The preformed piece is then heated in a controlled, oxygen starved atmosphere to fuse the metal particles into a sintered metal matrix. During heating, the resin carbonizes, and thus the finished member derives its structural integrity solely from the sintered metal matrix. The carbonaceous remains of the resin acts as a friction modifier. The preformed piece may be sintered to a metal backing plate during the heating step.

Depending upon its metal content, the finished friction material member may be classified as a sintered full metallic or a fused semi-metallic. When the metal content is high, 60 percent or more, the member is very similar to prior art full metallics; the difference being that the member has a slightly lower density and a slightly higher amount of carbonaceous material due to the carbonization of the resin. Performance is virtually indistinguishable from full metallics. With a high metal content, the principal advantage of the invention resides in substantially reduced manufacturing costs. First, the molding pressures may be greatly reduced -prior art full metallics requiring 30,000 to 70,000 PSI, the process of the invention requiring only minimal pressure necessary to cure the resin. Second, mold life is greatly increased due to the lower molding pressures. Finally, the addition of the resin as a processing aid surprisingly eliminates bulging and edge cracking during sintering. The resin holds the preformed member together until sintering of the metal powders begins. Thus, waste is substantially reduced.

When the metal content is reduced to 50 to 80 percent by weight of the mixture with a corresponding increase in carbonaceous material and friction enhancers, a new product is formed. Heretofore, it was not technically or economically possible to sinter materials with such low metal contents, as there is insufficient metal to metal contact to permit full sintering. When the metal content is low, it is necessary to add metal fibers (e.g., steel wool) to the mixture to bridge over and through the non-sinterable particles (i.e., carbonaceous material and friction enhancers). Here again, the resin acts to maintain the structural integrity of the preformed piece until sintering begins, thus making it possible to sinter mixtures containing as low as 50 percent by weight of metal particles.

The advantages of the fused semi-metallic are fivefold. First, the material may be used at operating temperatures far above 600° F. while maintaining its structural integrity and friction capabilities. Second, because the material may be sintered directly to a metal backing plate, detachment problems under high temperature and load conditions are eliminated. Third, flaming is eliminated. Fourth, because of the lower metal content than full metallics, excessive wear and grooving of the opposing surface is reduced. And fifth, the green performance is greatly enhanced, obviating the need for break in.

Other objects and advantages of the process and product of the invention will become apparent from the following detailed description.

DETAILED DESCRIPTION

As described more fully herein, the process of the present invention comprises preparing a mixture of sinterable metal particles, carbonaceous material, friction enhancers and curable polymeric resin; molding the mixture; curing the resin to form a pad; and thereafter heating the pad sufficiently to form a sintered metal matrix.

The metal particles comprise from about 50 to 95 percent of the total weight of mixture. The metal particles may be any of, or a combination of, well known powdered and/or fiberous sinterable metal particles, including but not limited to iron, copper, lead, tin and zinc powder, and steel wool. The specific combination of metal particles will depend upon the ultimate use that the friction material member is put to. For heavy duty disc brake pads, sinterable ferrous metal powders and/or fibers are desirable. When the metal content of the desired mixture is low, i.e., from about 50 to about 80 percent by weight of the mixture, it is desirable to add metal fibers. The fibers bridge over and through the non-sinterable materials (carbonaceous material and friction enhancers), thus increasing metal to metal contact necessary to the formation of a sintered metal matrix. When the metal content of the desired mixture is high, i.e., at least about 60 percent by weight of the mixture, metal fibers are not necessary and only metal powders need be used.

The carbonaceous material performs the function of a lubricant and a cushion within the sintered metal matrix to absorb thermo-shock and reduce noise. Graphite has been found to work well, but other carbonaceous materials such as coke, coal, carbon black and the like would be suitable.

Friction enhancers comprise from zero to about 20 percent of the total weight of the mixture. The friction enhancers perform the function of fillers, and friction modifiers and enhancers. Suitable inorganic minerals used as friction enhancers include, but are not limited to: alumina, aluminum oxide, chrome oxide, magnesium oxide, lead oxide, barium sulfate, quartz, silicon carbide, clay, mica, wollastonite, ceramic fibers, asbestos fibers and other mineral fibers. Organic materials, although not necessary, may also be used, e.g., tire buffings and cork. The specific minerals used is determined by the friction properties desired in the friction member.

Curable polymeric resin comprises from about 1 to about 15 percent of the total weight of the mixture. Sufficient resin should be used to coat and bond the metal particles, carbonaceous materials and friction enhancers. The resin functions to hold the mixture together during the heating step. Various types of organic resins are suitable, such as phenolic resin, epoxy or anaerobic resins. The resin may be heat, pressure or catalyst curing. Combination pressure and temperature curing phenolic resins, including one step and two step varieties, have been found to work well.

The foregoing materials are uniformly mixed and placed into a mold. The mixture is then subjected to conditions necessary to cure the resin, such as heat, pressure or catalyst. With a phenolic resin, the mixture may be cured by pressing the mixture under 1,000 to 15,000 PSI at 250° to 300° F.

The preformed piece is thereafter removed from the mold and placed in an oven where the piece is heated sufficiently to fuse the metal particles into a sintered metal matrix. Ferrous metal mixtures require temperatures in the range of 1500° to 1800° F. for about 2-3 hours. Copper metal mixtures require temperatures approximately 400° F. cooler. Sintering is preferrably done in an oxygen free atmosphere, such as an inert gas or nitrogen, so as to avoid burning or rusting during sintering. Pressure may also be applied during sintering, but it is not required.

During sintering, the resin decomposes giving off gases and leaving carbon behind. The carbonization of the resin does not interfere with the sintering of the metal particles. The removal of the gases produced by the decomposing resin, eliminates flaming problems occasionally encountered during use. The major benefit of the resin and its residue, however, is that it maintains sufficient bonding strength during heating until the metal particles begin to fuse, thus eliminating bulging and edge cracking commonly encountered in prior art sintered metal processes. The carbonaceous resin residue also acts as a friction modifier, much in the same manner as the before mentioned carbonaceous material.

The preformed piece may be sintered directly to a metal backing plate during the heating step. With a ferrous metal mixture and a steel backing plate, it has been found that copper plating the steel plate makes fusing the iron powder and steel fibers to the plate easier and stronger. Alternatively, the sintered piece may be welded, brazed or soldered to the metal backing plate.

The fusing of the member to a steel backing plate constitutes a major advancement over prior art organic adhesive attachment. In severe use of heavy duty truck disc brakes, temperatures of 750° F. at the attachment interface are often produced. At this temperature, tests (per SAE J840) have shown that the best available organic adhesives will shear at 180 PSI, while the sintered attachment of the fused semi-metallics of the invention provide at least over 400 PSI and typically over 550 PSI shear strengh. Thus, the sintered attachment eliminates common detachment problems associated with prior art semi-metallic friction members.

In addition, the temperature, pressure and duration of the heating step may be altered to precondition the member to the temperature and pressure conditions anticipated during the most severe use of the friction member. For example, as an alternative to full sintering, heat may be applied only to the wear surface to thermally precondition it. Heat may be applied with a hot press or blow torch. Surface heat treating has been found to greatly enhance the green performance of the member.

The following specific examples are intended to illustrate more fully the nature of the present invention without acting as a limitation upon its scope.

EXAMPLES

EXAMPLE 1

| Mixture: | % by Weight |
| --- | --- |
| Iron Powder | 50 |
| Copper Powder | 17 |
| Lead Powder | 5 |
| Tin Powder | 2 |
| Graphite | 13 |
| Aluminum Oxide | 8 |
| Phenolic Resin | 5 |

The above mixture was uniformly mixed and placed in mold for a heavy duty disc brake pad. The mold was then placed in a hot press and subjected to 290° F. and 9,000 PSI for five minutes. The cured preformed pad was removed from the mold and heated in a kiln for 2.5 hours at 1550° F. in an inert gas atmosphere. The finished friction material member was visually indistinguishable from a member made from the same mixture without phenolic resin that was pressed at room temperature at 50,000 PSI and sintered under the same conditions. Dynamometer testing revealed no major differences between the two samples. Yet, the cost of commercially producing the friction member prepared by the process of the invention is approximately half the cost of the equivalent prior art process.

EXAMPLE 2

| Mixture: | % by Weight |
| --- | --- |
| Steel Wool | 15 |
| Iron Powder | 48 |
| Graphite | 17 |
| Barium Sulfate | 5 |
| Aluminum Oxide | 2 |
| Magnesium Oxide | 5 |
| Phenolic Resin | 8 |

The above mixture was mixed, molded, cured and heated under the same conditions as in example 1, with the exception that the preformed disc brake pad was sintered directly to a clean copper plated steel backing plate.

The sample of this example and a sample of a similar mixture, prior art semi-metallic disc brake pad were subjected to the Federal Motor Vehicle Safety Standard Dynamometer Test Procedure (FMVSS-121) and the results compared. Within normal test variations, the friction effectiveness of the two materials were essentially equal. The product of the invention showed better new performance (less fade) over the prior art semi-metallic. In "brake power and recovery" the sample of the invention had less fade, with the fade and recovery characteristics becoming essentially equal after about four stops.

The two samples were also subjected to standard attachment shear tests per SAE J840. The prior art semi-metallic was attached to a steel backing plate with an organic adhesive. At room temperature the prior art semi-metallic sheared at 750 PSI and the sintered sample of the invention at 600 PSI. At 750° F., the prior art semi-metallic sample sheared at 180 PSI, a significant loss of shear strength from room temperature. The sintered sample of the invention showed only a minor decrease in shear strength at 750° F., shearing at 558 PSI.

While the preferred embodiments of the invention have been described, it will be apparent to those skilled in the art that various changes and modifications may be made without departing from the spirit or scope of the invention.

What is claimed is:

1. A method for making friction material members comprising the steps of:
   preparing a mixture of sinterable metal particles, carbonaceous material and curable polymeric resin, the mixture comprising at least about 50 percent by weight of sinterable metal particles and sufficient curable polymeric resin to coat and bond the metal particles and carbonaceous material;
   placing the mixture in a mold;
   curing the resin to form the mixture into a piece in a solid preformed shape corresponding to the shape of the mold; and thereafter
   heating the preformed piece sufficiently to carbonize the resin and fuse the metal particles into a sintered metal matrix.

2. A method for making friction material members according to claim 1, wherein friction enhancers are added to the mixture.

3. The method of claim 2, wherein the friction enhancers are selected from the following group consisting of alumina, aluminum oxide, chrome oxide, magnesium oxide, lead oxide, barium sulfate, quartz, silicon carbide, clay, mica, wollastonite, ceramic fibers, asbestos fibers and mixtures thereof.

4. The method of claim 1, wherein the sinterable metal particles are selected from the following group consisting of powdered iron, powdered copper, powdered lead, powdered tin, powdered zinc, steel wool and mixtures thereof.

5. The method of claim 1, wherein the carbonaceous material is selected from the following group consisting of graphite, coke, coal, carbon black and mixtures thereof.

6. The method of claim 1, wherein the resin is cured by applying sufficient heat and pressure to the molded mixture to cure the resin therein.

7. The method of claim 1, wherein the resin is a phenolic resin.

8. A method of making friction material members according to claim 1, wherein the preformed piece is sintered to a metal backing plate.

9. The method of claim 8, wherein the preformed piece is sintered to the metal backing plate during the step of heating.

10. The method of claim 8, wherein the metal backing plate is steel.

11. The method of claim 10, comprising the further step of copper plating the steel backing plate before sintering the member thereto.

12. The method of claim 8, wherein the sintering of the member to the metal backing plate develops at least about 400 PSI shear strength between the member and the plate.

13. A method for making friction material members according to claim 1, comprising the further step of welding the sintered member to a metal backing plate.

14. A method for making friction material members according to claim 1, comprising the further step of brazing the sintered member to a metal backing plate.

15. A method for making friction material members according to claim 1, comprising the further step of soldering the sintered member to a metal backing plate.

16. A method for making friction material members comprising the steps of:
preparing a mixture comprising at least about 60 percent by weight of sinterable metal powders, from about 5 to about 30 percent by weight of carbonaceous material, and from zero to about 15 percent by weight of friction enhancers;
adding sufficient curable polymeric resin to coat and bond the metal powders, carbonaceous material and friction enhancers;
placing the mixture in a mold;
curing the resin to form the mixture into a piece in a solid preformed shape corresponding to the shape of the mold; and thereafter
heating the preformed piece in a substantially oxygen free atmosphere for a time and at a temperature sufficient to carbonize the resin and fuse the metal powders into a sintered metal matrix.

17. A method for making friction material members comprising the steps of:
preparing a mixture of sinterable metal powders, metal fibers, carbonaceous material, friction enhancers and curable polymeric resin, the mixture comprising at least about 50 percent by weight of metal powders and metal fibers, and from about 4 to about 15 percent by weight of curable polymeric resin;
placing the mixture in a mold;
curing the resin to form the mixture into a piece in a solid preformed shape corresponding to the shape of the mold; and thereafter
heating the preformed piece under temperature and compressive pressure conditions to precondition the member to temperature and compressive pressure conditions anticipated during subsequent use of the friction material member.

18. A method for making a friction material member according to claim 17, wherein the heating step comprises heating the preformed piece in a substantially oxygen free atmosphere for a time and at a temperature sufficient to carbonize the resin and fuse the metal powders and fibers into a sintered metal matrix.

19. A method for making friction material members according to claim 17, wherein the heating step comprises heating one surface of the preformed piece to fuse the metal powders and fibers proximate to the one surface.

20. The product of the process of claim 1.

21. A friction material member comprising: a sintered metal matrix, at least one surface of said metal matrix having carbonaceous material and friction enhancers substantially uniformly distributed therein, said metal matrix comprising from about 50 to about 80 percent by weight of the friction material member.

22. A friction material member as in claim 21, further comprising a metal backing plate sintered to said metal matrix.

23. A friction material member as in claim 22, wherein said metal backing plate is steel.

24. A friction material member as in claim 22, wherein said metal backing plate is copper plated steel.

25. A friction material member as in claim 22, wherein the shear strength between said matrix and said plate is at least about 400 PSI.

26. A friction material member as in claim 21, further comprising a metal backing plate welded to said metal matrix.

27. A friction material member as in claim 21, further comprising a metal backing plate brazed to said metal matrix.

28. A friction material member as in claim 21, further comprising a metal backing plate soldered to said metal matrix.

29. A friction material member comprising a substantially uniform mixture of metal particles, carbonaceous material and friction enhancers; said metal particles comprising at least about 50 percent by weight of said mixture; said mixture bonded together by a polymeric resin; wherein on at least one surface of the friction material, said metal particles are fused together.

* * * * *